(12) United States Patent
Makino et al.

(10) Patent No.: US 9,270,156 B2
(45) Date of Patent: Feb. 23, 2016

(54) LINEAR MOTOR

(71) Applicant: KABUSHIKI KAISHA YASKAWA DENKI, Kitakyushu-shi (JP)

(72) Inventors: Shogo Makino, Kitakyushu (JP); Motomichi Ohto, Kitakyushu (JP); Yuji Arinaga, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/311,351

(22) Filed: Jun. 23, 2014

(65) Prior Publication Data
US 2015/0028697 A1 Jan. 29, 2015

(30) Foreign Application Priority Data

Jul. 29, 2013 (JP) ................................. 2013-156803

(51) Int. Cl.
*H02K 41/03* (2006.01)
*H02K 29/08* (2006.01)

(52) U.S. Cl.
CPC .............. *H02K 41/033* (2013.01); *H02K 41/03* (2013.01); *H02K 41/031* (2013.01); *H02K 29/08* (2013.01)

(58) Field of Classification Search
CPC .... H02K 41/03; H02K 41/031; H02K 41/033
IPC ............................. H02K 41/03, 41/031, 41/033
See application file for complete search history.

(56) References Cited

U.S. PATENT DOCUMENTS

| | | | | |
|---|---|---|---|---|
| 4,689,529 | A * | 8/1987 | Higuichi | 318/135 |
| 5,602,431 | A * | 2/1997 | Satomi | H02K 41/031 |
| | | | | 310/12.17 |
| 7,928,611 | B2 * | 4/2011 | Hoppe | 310/12.19 |
| 2007/0222304 | A1 * | 9/2007 | Jajtic et al. | 310/12 |
| 2008/0164830 | A1 * | 7/2008 | Jajtic et al. | 318/135 |
| 2008/0265689 | A1 * | 10/2008 | Armeit et al. | 310/12 |
| 2009/0302786 | A1 * | 12/2009 | Kim et al. | 318/135 |

FOREIGN PATENT DOCUMENTS

| | | |
|---|---|---|
| JP | 62-114462 | 5/1987 |
| JP | 63-021483 U | 2/1988 |

(Continued)

OTHER PUBLICATIONS

Japanese Office Action for corresponding JP Application No. 2013-156803, Jun. 2, 2015.

(Continued)

*Primary Examiner* — Dang Le
(74) *Attorney, Agent, or Firm* — Mori & Ward, LLP

(57) ABSTRACT

A linear motor includes a stator and an armature that faces the stator with a gap therebetween. The stator has an elongated shape extending so as to cross a direction in which the stator faces the armature, and includes a plurality of salient poles that are arranged along a longitudinal direction of the stator and protrude toward the armature. The armature includes an armature core including a tooth that protrudes toward the stator, an armature winding wound around the tooth, a plurality of permanent magnets disposed on an end side of the tooth so as to be arranged along the longitudinal direction of the stator, and a magnetic-field sensor that detects a magnetic field which is generated by the plurality of permanent magnets and which passes through the plurality of salient poles.

14 Claims, 5 Drawing Sheets

(56) References Cited

FOREIGN PATENT DOCUMENTS

| | | |
|---|---|---|
| JP | 63-228954 | 9/1988 |
| JP | 10-66328 | 3/1998 |
| JP | 2009-219199 | 9/2009 |
| JP | 2011-061995 | 3/2011 |
| JP | 2012-175852 | 9/2012 |
| JP | 2013-021787 | 1/2013 |

OTHER PUBLICATIONS

Korean Office Action for corresponding KR Application No. 10-2014-0095551, Nov. 18, 2015.

* cited by examiner

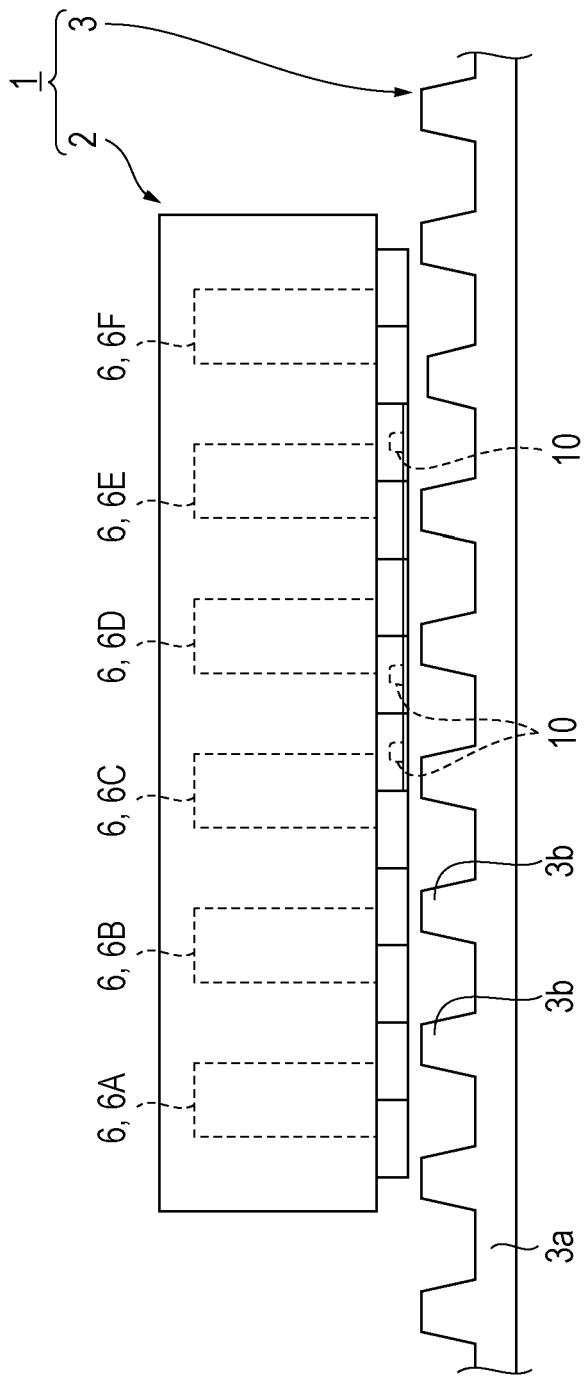

LINEAR MOTOR

CROSS-REFERENCE TO RELATED APPLICATIONS

The present disclosure contains subject matter related to that disclosed in Japanese Priority Patent Application JP 2013-156803 filed in the Japan Patent Office on Jul. 29, 2013, the entire contents of which are hereby incorporated by reference.

BACKGROUND

1. Field of the Invention

The embodiment disclosed herein relates to a linear motor.

2. Description of the Related Art

A linear motor includes an armature and an elongated stator that face each other with a gap therebetween, and generates a relative motion between the armature and the stator along the longitudinal direction of the stator. Japanese Unexamined Patent Application Publication No. 2009-219199 discloses an example of such a linear motor, in which an armature includes an armature core, armature windings, and a plurality of permanent magnets, and a stator includes a plurality of salient poles. The armature core has teeth that protrude toward the stator, and the armature windings are wound around the teeth. The plurality of permanent magnets are disposed on an end side of the teeth, and are arranged along the longitudinal direction of the stator. The plurality of salient poles are arranged along the longitudinal direction of the stator and protrude toward the armature. The armature causes the armature core, the armature windings, and the permanent magnets to cooperate with one another, so as to generate a travelling magnetic field. When the travelling magnetic field acts on the salient poles of the stator, the foregoing relative motion occurs.

SUMMARY

According to an aspect of the disclosure, there is provided a linear motor including a stator and an armature that faces the stator with a gap therebetween. The stator has an elongated shape extending so as to cross a direction in which the stator faces the armature, and includes a plurality of salient poles that are arranged along a longitudinal direction of the stator and protrude toward the armature. The armature includes an armature core including a tooth that protrudes toward the stator, an armature winding wound around the tooth, a plurality of permanent magnets disposed on an end side of the tooth so as to be arranged along the longitudinal direction of the stator, and a magnetic-field sensor that detects a magnetic field which is generated by the plurality of permanent magnets and which passes through the plurality of salient poles.

BRIEF DESCRIPTION OF THE DRAWINGS

FIG. 6 is a side view illustrating still another example of arrangement of magnetic-field sensors.

DESCRIPTION OF THE EMBODIMENT

Figure 1:
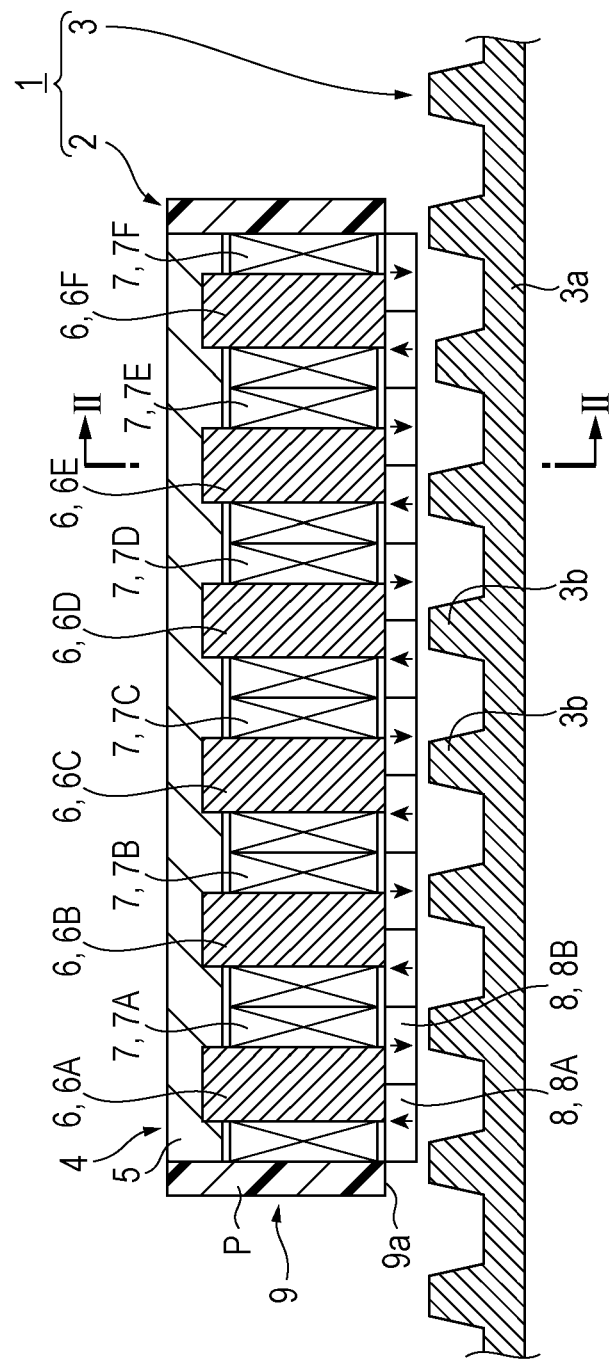
FIG. 1 is a cross-sectional view illustrating a schematic configuration of a linear motor according to an embodiment.

Hereinafter, an embodiment will be described in detail with reference to the drawings. In the following description, the same elements or elements having the same function are denoted by the same reference numerals, and a duplicate description is omitted.

A linear motor 1 according to this embodiment is used for, for example, a table feeder or the like in various factory automation (FA) apparatuses, such as a manufacturing apparatus or a processing apparatus. As illustrates in FIGS. 1 and 2, the linear motor 1 includes an armature 2 and a stator 3 that face each other with a gap therebetween. The stator 3 has an elongated shape extending so as to be orthogonal to a direction in which the stator 3 faces the armature 2, and is fixed to an installation target (for example, a main body portion of an FA apparatus). The armature 2 is supported by a liner guide (not illustrated) so as to be movable along the longitudinal direction of the stator 3. The armature 2 is fixed to a drive target (for example, a table of the FA apparatus). The linear motor 1 generates a relative motion of the armature 2 with respect to the stator 3 along the longitudinal direction of the stator 3, thereby transporting the drive target. Alternatively, the armature 2 may be fixed to the installation target, and the stator 3 may be fixed to the drive target. In this case, the linear motor 1 generates a relative motion of the stator 3 with respect to the armature 2, thereby transporting the drive target.

Next, the configurations of the stator 3 and the armature 2 will be described in detail. As for "upper side", "lower side", "front and back directions", and "right and left directions" in the following description, the armature 2 side corresponds to the upper side, the stator 3 side corresponds to the lower side, and a one end side of the stator 3 corresponds to the front direction.

The stator 3 includes a yoke 3a and a plurality of salient poles 3b. The yoke 3a has a band shape extending along the front and back directions and along the right and left directions. The plurality of salient poles 3b are arranged along the front and back directions and protrude upward from the yoke 3a. The salient poles 3b extend along the right and left directions and have a trapezoidal cross section. The shape of the cross section of the salient poles 3b is not limited to trapezoidal, and may be, for example, rectangular or semicircular.

The stator 3 is made of a ferrous soft magnetic material, such as 3% ferrosilicon. The stator 3 may be formed by stacking electromagnetic steel sheets, such as silicon steel sheets, along the right and left directions, or may be formed by compression-molding a soft magnetic composite (SMC) material, or may be integrally formed using a ferrous structural material.

The armature 2 includes an armature core 4, six sets of armature windings 7 (7A to 7F), twelve permanent magnets 8 (8A and 8B), and six magnetic-field sensors 10.

The armature core 4 includes a yoke 5 and six teeth 6 (6A to 6F). The yoke 5 has a flat plate shape extending along the front and back directions and along the right and left directions. The six teeth 6 are arranged along the front and back directions and protrude downward from the yoke 5.

The armature core 4 is made of a ferrous soft magnetic material, such as 3% ferrosilicon. The armature core 4 may be formed by stacking electromagnetic steel sheets, such as silicon steel sheets, along the right and left directions, or may be formed by compression-molding a soft magnetic composite (SMC) material.

The six sets of armature windings 7 are wound around the six teeth 6, respectively. The armature winding 7A wound around the forefront tooth 6A, the armature winding 7C wound around the tooth 6C that is third from the front, and the armature winding 7E wound around the tooth 6E that is fifth from the front are supplied with three phases of alternating currents which are out of phase to one another by a one-third period, respectively. Hereinafter, the alternating current supplied to the armature winding 7A is referred to as a "U-phase AC", the alternating current supplied to the armature winding 7C is referred to as a "V-phase AC", and the alternating current supplied to the armature winding 7E is referred to as a "W-phase AC".

The armature winding 7B wound around the tooth 6B that is second from the front, the armature winding 7D wound around the tooth 6D that is fourth from the front, and the armature winding 7F wound around the tooth 6F that is sixth from the front are supplied with a W-phase AC, a U-phase AC, and a V-phase AC, respectively. The directions in which the ACs are supplied to the armature windings 7B, 7D, and 7F are opposite to the directions in which the ACs are supplied to the armature windings 7A, 7C, and 7E, respectively.

The armature core 4 and the armature windings 7 are integrated together by a mold member P, so as to form an electromagnet unit 9. The mold member P is made of, for example, epoxy resin. The electromagnet unit 9 has a rectangular parallelepiped shape extending along the front and back directions. A lower surface 9a of the electromagnet unit 9 is substantially flush with end surfaces (lower surfaces) of the teeth 6.

The twelve permanent magnets 8 are fixed to the lower surface 9a of the electromagnet unit 9 by an adhesive or the like in the state of being arranged along the front and back directions. The individual permanent magnets 8 extend along the right and left directions and have a rectangular cross section. Among the twelve permanent magnets 8, six permanent magnets 8A are arranged such that the south pole corresponds to the lower side and the north pole corresponds to the upper side. The six other permanent magnets 8B are arranged such that the north pole corresponds to the lower side and the south pole corresponds to the upper side. The permanent magnets 8A and the permanent magnets 8B are alternately arranged, and a pair of permanent magnets 8A and 8B are disposed for each tooth 6. That is, a pair of permanent magnets 8A and 8B that are arranged along the front and back directions are provided on the end side of each tooth 6.

Figure 2:
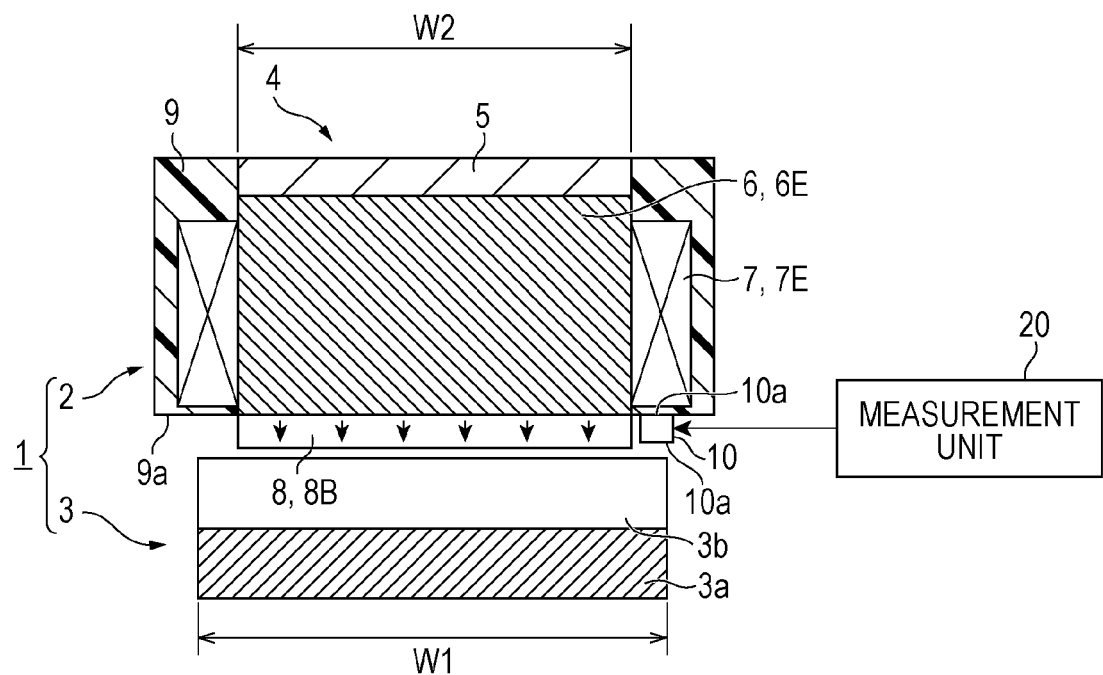
FIG. 2 is a cross-sectional view taken along line II-II of FIG. 1, illustrating an example of arrangement of magnetic-field sensors.
Figure 3:
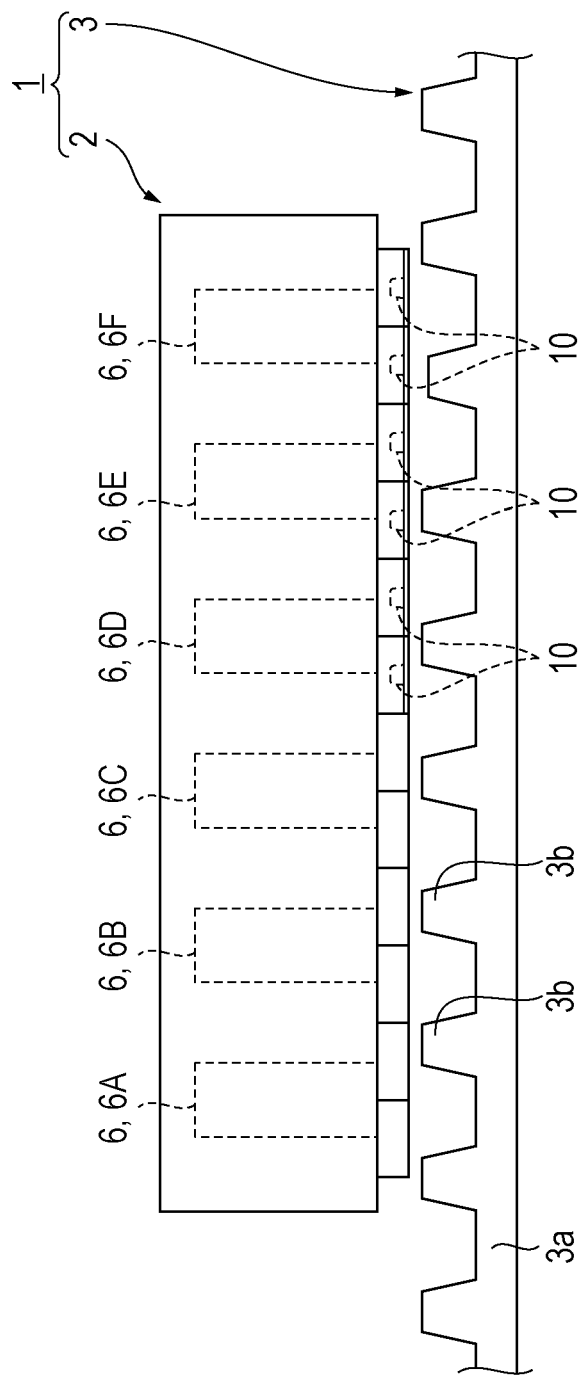
FIG. 3 is a side view of the linear motor illustrated in FIG. 1.

As illustrated in FIGS. 2 and 3, the magnetic-field sensors 10 are disposed on the outer side of the permanent magnets 8 in the right and left directions (the width direction of the stator 3). The six magnetic-field sensors 10 are disposed so as to correspond to the permanent magnets 8A and 8B on the end side of the tooth 6D, the permanent magnets 8A and 8B on the end side of the tooth 6E, and the permanent magnets 8A and 8B on the end side of the tooth 6F, in the front and back directions. That is, among the six magnetic-field sensors 10, two magnetic-field sensors 10 correspond to the armature winding 7D that receives a U-phase AC. Two other magnetic-field sensors 10 correspond to the armature winding 7E that receives a W-phase AC. The two other magnetic-field sensors 10 correspond to the armature winding 7F that receives a V-phase AC. In this way, two magnetic-field sensors 10 are disposed for one of three phases of ACs. In this state, the magnetic-field sensors 10 are fixed to the electromagnet unit 9.

Each of the magnetic-field sensors 10 is a Hall element or a Hall IC including a Hall element, and detects a magnetic field. The magnetic-field sensor 10 has magnetosensitive surfaces 10a that face the upper side and the lower side. The magnetosensitive surfaces 10a cross the direction of a magnetic field that is detectable by the magnetic-field sensor 10.

As illustrated in FIG. 2, a width W1 of the salient pole 3b in the right and left directions is larger than a width W2 of the tooth 6 and the permanent magnet 8 in the right and left directions. In the right and left directions, an end portion of the salient pole 3b extends to the outer side of an end portion of the permanent magnet 8, and is located below the magnetic-field sensor 10. One of the magnetosensitive surfaces 10a of the magnetic-field sensor 10 faces the salient pole 3b from the upper side.

In the linear motor 1, a travelling magnetic field is generated by cooperation among the armature core 4, the armature windings 7, and the permanent magnets 8 of the armature 2, the travelling magnetic field acts on the salient poles 3b, and thereby thrust is generated. The thrust generates a relative motion between the armature 2 and the stator 3 along the longitudinal direction of the stator 3.

Figure 4:
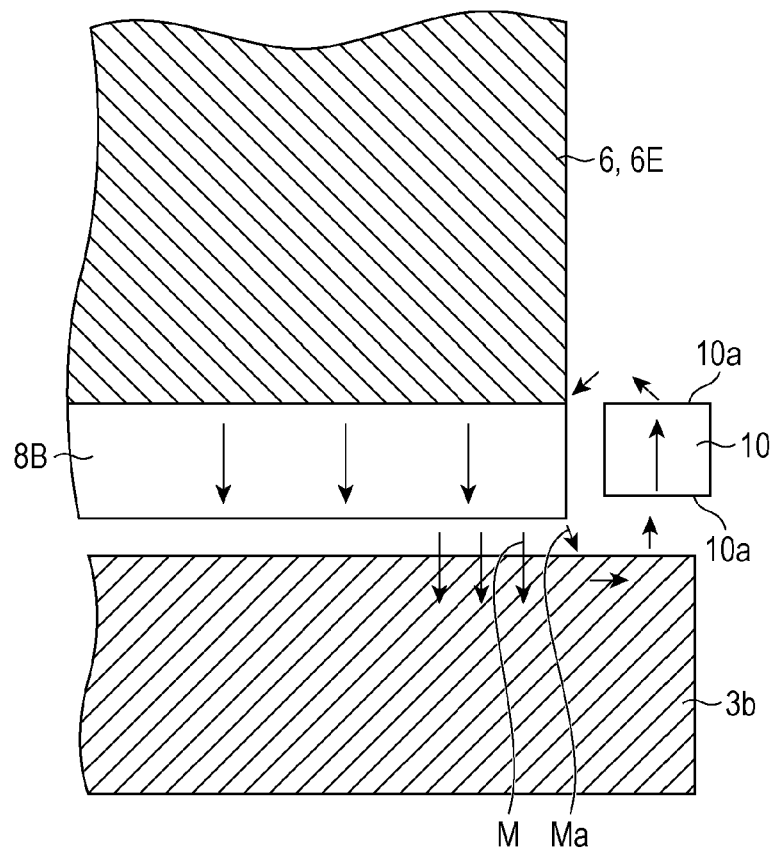
FIG. 4 is an enlarged view schematically illustrating a magnetic field led to a magnetic-field sensor by a salient pole.

To generate expected thrust, it is necessary to detect the relative positions of the salient poles 3b with respect to the armature 2 and generate a travelling magnetic field in accordance with the positions of the salient poles 3b. As illustrated in FIG. 4, part of a magnetic field M generated by the permanent magnet 8B is also used as a target to be detected by the magnetic-field sensor 10. Specifically, a magnetic field Ma generated at an end portion of the permanent magnet 8B in the right and left directions is used as a target to be detected.

At the end portion of the permanent magnet 8B, the magnetic field Ma is generated downward from the permanent magnet 8B. The magnetic field Ma is led toward the magnetic-field sensor 10 by the salient pole 3b, and passes through the magnetosensitive surface 10a of the magnetic-field sensor 10 from the lower side toward the upper side. On the other hand, at an end portion of the permanent magnet 8A, a magnetic field Ma that enters the permanent magnet 8A from the lower side is generated. The magnetic field Ma is led toward the magnetic-field sensor 10 by the salient pole 3b, and passes through the magnetoresistive surface 10a of the magnetic-field sensor 10 from the upper side toward the lower side.

In this way, a magnetic field to be detected is led toward the magnetic-field sensor 10 by the salient pole 3b, and thus the magnetic field to be detected by the magnetic-field sensor 10 becomes more intense as the distance between the salient pole 3b and the permanent magnet 8 decreases. Thus, the relative position of the salient pole 3b with respect to the permanent magnet 8 can be detected on the basis of the intensity of the magnetic field detected by the magnetic-field sensor 10. Accordingly, the relative position of the salient pole 3b with respect to the armature 2 can be detected using a simple structure using the magnetic-field sensor 10. The permanent magnet 8 for generating a travelling magnetic field is also used to generate a magnetic field to be detected. This contributes to simplifying the structure of detecting the relative position of the salient pole 3b.

The magnetic field sensor 10 is disposed so as to face the salient pole 3b with a gap therebetween. Thus, a magnetic field generated by the permanent magnet 8 can be more efficiently led toward the magnetic-field sensor 10 by the salient pole 3b, and the relative position of the salient pole 3b with respect to the permanent magnet 8 can be detected with higher sensitivity.

Figure 5:
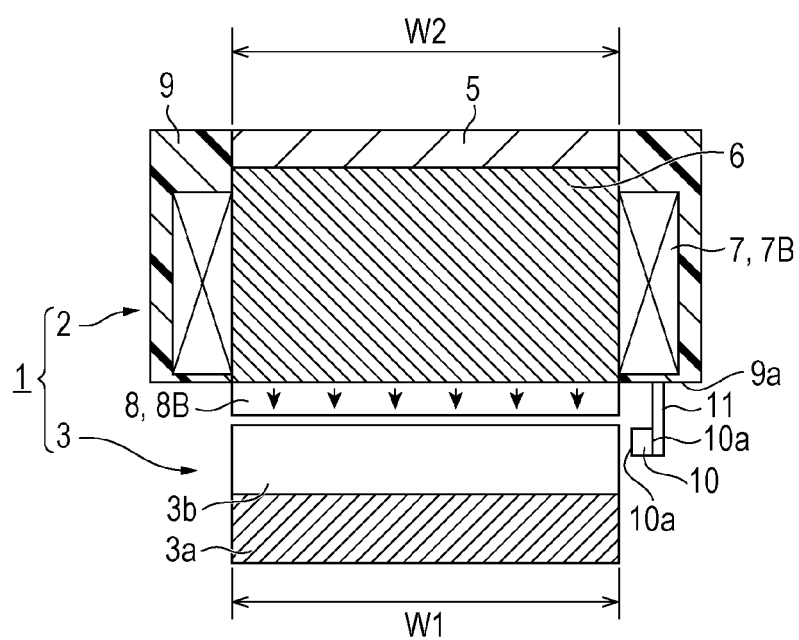
FIG. 5 is a cross-sectional view illustrating another example of arrangement of magnetic-field sensors.

The manner in which the magnetic-field sensor 10 faces the salient pole 3b is not limited to that described above. FIG. 5 illustrates an example in which the magnetic-field sensor 10 is disposed so as to face the salient pole 3b from the outer side in the right and left directions. In this case, the width W1 of the salient pole 3b in the right and left directions does not have to be larger than the width W2 of the tooth 6 and the permanent magnet 8. Thus, in the example illustrated in FIG. 5, the width W1 of the salient pole 3b is equal to the width W2 of the tooth 6 and the permanent magnet 8. The magnetic-field sensor 10 is located on the outer side of the salient pole 3b in the right and left directions, at the height corresponding to the salient pole 3b. The magnetosensitive surfaces 10a of the magnetic-field sensor 10 face the right side and the left side. In this state, the magnetic-field sensor 10 is fixed to the armature core 4 via a connecting member 11. The connecting member 11 is made of, for example, a ferrous soft magnetic material.

According to this example, the relative position of the salient pole 3b with respect to the permanent magnet 8 can be detected by effectively using the side surface of the salient pole 3b. Further, the connecting member 11 can be used as a path of a magnetic field, and thus a magnetic field generated by the permanent magnet 8 can be more efficiently led to the magnetic-field sensor 10, and the relative position of the salient pole 3b with respect to the permanent magnet 8 can be detected with higher sensitivity.

Each of the magnetic-field sensors 10 is disposed so as to correspond to at least one of the permanent magnets 8 in the front and back directions, and is disposed on the outer side of the permanent magnet 8 in the right and left directions. Thus, in the direction in which the armature 2 and the stator 3 move relatively to each other, the magnetic-field sensors 10 do not extend to the outer side of the armature 2, and thus a decrease in motion strokes that may be caused by installation of the magnetic-field sensors 10 can be suppressed.

In the right and left directions, the end portions of the salient poles 3b extend to the outer side of the end portions of the permanent magnets 8, and the magnetic-field sensors 10 face the salient poles 3b from the armature 2 side. Thus, the magnetic-field sensors 10 can be disposed near the permanent magnets 8 and can face the salient poles 3b. Accordingly, a magnetic field generated by the permanent magnets 8 can be led to the magnetic-field sensors 10 more efficiently, and the relative positions of the salient poles 3b with respect to the permanent magnets 8 can be detected with higher sensitivity.

The linear motor 1 includes the plurality of magnetic-field sensors 10 arranged in the front and back directions. With use of the plurality of magnetic-field sensors 10, the relative positions of the salient poles 3b with respect to the armature 2 can be detected with higher accuracy.

The armature 2 includes the plurality of teeth 6 arranged in the front and back directions, and the plurality of armature windings 7 that are wound around the respective teeth 6 and receive ACs of a plurality of phases, respectively. The magnetic-field sensors 10 are disposed for the respective phases of ACs. Thus, the phases corresponding to the armature windings 7 close to the salient poles 3b can be detected with high accuracy, and a travelling magnetic field can be set to the position of the salient poles 3b more reliably.

The manner in which the magnetic-field sensors 10 are arranged for individual phases of ACs is not limited to that described above. FIG. 6 illustrates an example in which three magnetic-field sensors 10 are arranged for individual phases of ACs. In this example, the three magnetic-field sensors 10 are arranged so as to correspond to the permanent magnet 8B on the end side of the tooth 6C, the permanent magnet 8A on the end side of the tooth 6D, and the permanent magnet 8B on the end side of the tooth 6E, respectively. That is, one of the magnetic-field sensors 10 corresponds to the armature winding 7C that receives a V-phase AC. Another one of the magnetic-field sensors 10 corresponds to the armature winding 7D that receives a U-phase AC. The other magnetic-field sensor 10 corresponds to the armature winding 7E that receives a W-phase AC. In this way, the magnetic-field sensors 10 are arranged such that each magnetic-field sensor 10 corresponds to one of the three phases of ACs.

The linear motor 1 may further include a measurement unit 20 that measures an amount of relative movement of the armature 2 and the stator 3 on the basis of an output of the magnetic-field sensors 10 (see FIG. 2). The measurement unit 20 may be constituted by, for example, a computer having a port that obtains an output of the magnetic-field sensors 10. In this case, it is not necessary to provide a measurement device dedicated to measure an amount of relative movement. Accordingly, the configuration of an apparatus including the linear motor 1 can be simplified.

The embodiment has been described above. The disclosure given here is not necessarily limited to the above-described embodiment, and various changes may be implemented without deviating from the gist thereof. For example, the number of magnetic-field sensors 10 may be one. The magnetic-field sensor 10 may be disposed so as to be adjacent to the permanent magnet 8 in the front and back directions. The number of teeth 6, the number of armature windings 7, and the assignment of three phases of ACs may be changed as appropriate. The number and disposition of the permanent magnets 8 may also be changed as appropriate. The number of phases of ACs supplied to the armature windings 7 is not necessarily limited to three. As long as thrust can be continuously generated, the number of phases may be one, two, or four or more.

It should be understood by those skilled in the art that various modifications, combinations, sub-combinations and alterations may occur depending on design requirements and other factors insofar as they are within the scope of the appended claims or the equivalents thereof.

What is claimed is:

1. A linear motor comprising:
a stator; and
an armature that faces the stator in a first direction with a gap therebetween, wherein
the stator has an elongated shape extending in a longitudinal direction that is orthogonal to the first direction in which the stator faces the armature, and includes a plurality of salient poles that extend in a width direction that is orthogonal to both the first direction and the longitudinal direction, the plurality of salient poles are arranged along the longitudinal direction of the stator and protrude toward the armature, and
the armature includes
an armature core including a tooth that protrudes toward the stator,
an armature winding wound around the tooth,
a plurality of permanent magnets disposed on an end side of the tooth so as to be arranged along the longitudinal direction of the stator, and
a magnetic-field sensor that detects a magnetic field which is generated by the plurality of permanent magnets and which passes through the plurality of salient poles,
wherein the magnetic-field sensor is disposed beyond an outer side of the plurality of permanent magnets in the width direction, and
wherein the magnetic-field sensor has a surface that overlaps in a direction parallel to the first direction with an upper surface of a salient pole of the plurality of salient poles when the magnetic-field sensor is aligned with the salient pole in the longitudinal direction.

2. The linear motor according to claim 1, wherein the magnetic-field sensor is disposed so as to face any one of the plurality of salient poles with a gap therebetween.

3. The linear motor according to claim 1, wherein the magnetic-field sensor is disposed so as to correspond to at least one of the plurality of permanent magnets in the longitudinal direction of the stator, and is disposed on an outer side of the permanent magnet in a width direction of the stator.

4. The linear motor according to claim 3, wherein end portions of the plurality of salient poles extend to an outer side of end portions of the plurality of permanent magnets in the width direction of the stator, and the magnetic-field sensor faces any one of the plurality of salient poles from a side of the armature.

5. The linear motor according to claim 3, wherein the magnetic-field sensor faces any one of the plurality of salient poles from an outer side of the stator in the width direction of the stator.

6. The linear motor according to claim 1, wherein the magnetic-field sensor is fixed to the armature core via a connecting member made of a soft magnetic material.

7. The linear motor according to claim 1, wherein the magnetic-field sensor is one of a plurality of magnetic-field sensors arranged in the longitudinal direction of the stator.

8. The linear motor according to claim 7,
wherein the tooth is one of a plurality of teeth arranged in the longitudinal direction of the stator, the armature winding is one of a plurality of armature windings that are respectively wound around the plurality of teeth and that respectively receive alternating currents of a plurality of phases, and
wherein at least one magnetic-field sensor of the plurality of magnetic-field sensors is arranged for each of the respective phases of the alternating currents.

9. The linear motor according to claim 1, further comprising a measurement unit that measures, based on an output of the magnetic-field sensor, an amount of relative movement of the armature and the stator.

10. A linear motor comprising:
a stator; and
an armature that faces the stator in a first direction with a gap therebetween, wherein
the stator has an elongated shape extending in a longitudinal direction that is orthogonal to the first direction in which the stator faces the armature, and includes a plurality of salient poles that extend in a width direction that is orthogonal to both the first direction and the longitudinal direction, the plurality of salient poles are arranged along the longitudinal direction of the stator and protrude toward the armature, and
the armature includes
an armature core including a tooth that protrudes toward the stator,
an armature winding wound around the tooth,
a plurality of permanent magnets disposed on an end side of the tooth so as to be arranged along the longitudinal direction of the stator, and
a magnetic-field sensor that detects a magnetic field which is generated by the plurality of permanent magnets and which passes through the plurality of salient poles,
wherein the magnetic-field sensor has a surface that overlaps in a direction parallel to the width direction with an outer side surface of a salient pole of the plurality of salient poles when the magnetic-field sensor is aligned with the salient pole in the longitudinal direction.

11. A linear motor comprising:
a stator; and
an armature that faces the stator in a first direction with a gap therebetween, wherein
the stator has an elongated shape extending in a longitudinal direction that is orthogonal to the first direction in which the stator faces the armature, and includes a plurality of salient poles that extend in a width direction that is orthogonal to both the first direction and the longitudinal direction, the plurality of salient poles are arranged along the longitudinal direction of the stator and protrude toward the armature,
the armature includes
an armature core including a plurality of teeth that protrude toward the stator,
a plurality of armature windings that are respectively wound around the plurality of teeth and that respectively receive alternating currents of a plurality of phases,
a plurality of permanent magnets disposed on end sides of the plurality of teeth so as to be arranged along the longitudinal direction of the stator, and
a plurality of magnetic-field sensors that detect a magnetic field which is generated by the plurality of permanent magnets and which passes through the plurality of salient poles,
at least one magnetic-field sensor of the plurality of magnetic-field sensors is arranged for each of the respective phases of the alternating currents, and
the at least one magnetic-field sensor is disposed beyond an outer side of the plurality of permanent magnets in the width direction.

12. The linear motor according to claim 11, wherein the at least one magnetic-field sensor has a surface that overlaps in a direction parallel to the width direction with an outer side surface of a salient pole of the plurality of salient poles when the magnetic-field sensor is aligned with the salient pole in the longitudinal direction.

13. The linear motor according to claim 11, wherein the at least one magnetic-field sensor has a surface that overlaps in a direction parallel to the width direction with an outer side surface of a permanent magnet of the plurality of permanent magnets when the magnetic-field sensor is aligned with the permanent magnet in the longitudinal direction.

14. The linear motor according to claim 11, the at least one magnetic-field sensor is entirely disposed beyond an outer side of the plurality of permanent magnets in the width direction.

* * * * *